US006377940B2

(12) United States Patent
Tilfors et al.

(10) Patent No.: US 6,377,940 B2
(45) Date of Patent: Apr. 23, 2002

(54) METHOD AND APPARATUS FOR SETTING A PRICE FOR A SECURITY ON AN AUTOMATED EXCHANGE BASED ON A COMPARISON OF PRICES ON OTHER EXCHANGES

(75) Inventors: Jan Tilfors, Stockholm (SE); Gary Katz, Plainview, NY (US)

(73) Assignee: International Securities Exchange, LLC, New York, NY (US)

( * ) Notice: Subject to any disclaimer, the term of this patent is extended or adjusted under 35 U.S.C. 154(b) by 0 days.

(21) Appl. No.: 09/186,155

(22) Filed: Nov. 5, 1998

(51) Int. Cl.[7] .............................................. G06F 17/60
(52) U.S. Cl. ...................................................... 705/37
(58) Field of Search ..................................... 705/35, 37

(56) References Cited

U.S. PATENT DOCUMENTS

| | | | |
|---|---|---|---|
| 3,573,747 A | 4/1971 | Adams et al. ................. 705/37 |
| 3,581,072 A | * 5/1971 | Nymeyer ..................... 235/152 |
| 4,412,287 A | * 10/1983 | Braddock, III .............. 364/408 |
| 4,674,044 A | 6/1987 | Kalmus et al. ............... 705/37 |
| 4,903,201 A | 2/1990 | Wagner ....................... 364/408 |
| 4,980,826 A | 12/1990 | Wagner ....................... 714/755 |
| 5,101,353 A | * 3/1992 | Lupien et al. .............. 364/408 |
| 5,136,501 A | 8/1992 | Silverman et al. ............ 705/37 |
| 5,297,032 A | 3/1994 | Trojan et al. ................. 705/37 |
| 5,305,200 A | * 4/1994 | Hartheimer et al. ......... 364/408 |
| 5,689,652 A | 11/1997 | Lupien et al. ................ 705/37 |
| 5,913,202 A | 6/1999 | Motoyama .................... 705/35 |
| 5,970,479 A | 10/1999 | Shepherd ..................... 705/37 |
| 5,978,779 A | 11/1999 | Stein et al. ................... 705/37 |

FOREIGN PATENT DOCUMENTS

WO    WO 00/28450    * 5/2000 ........... G06F/17/60

OTHER PUBLICATIONS

How is a Trade Executed—Limit Order. Printed from the Nasdaq Web Page on Mar. 7, 2000.*
How is a Trade Executed—Market Order. Printed from the Nasdaq Web Page on Mar. 7, 2000.*
Cosgrove, Suzanne. Courting Retail, Institutional Customers, CBOE, AMEX get Creative. Knight–Ridder Financial News, Jan. 1993.*
Michaels, George. Distributed Electronic Ordering System, financial software from Financial Technology Corp. Wall Street Computer Review, vol. 8, No. 11, pp. 53–55, Aug. 1991.*
Amihud et al. Liquidity, Aset Prices and Financial Policy. Financial Analysts Journal, vol. 47, No. 6, pp. 56–66, Mar. 2000.*

* cited by examiner

Primary Examiner—Vincent Millin
Assistant Examiner—Geoffrey Akers
(74) Attorney, Agent, or Firm—Stephen J. Lieb; Frommer Lawrence & Haug LLP

(57) ABSTRACT

In an automated exchange system a method and a device which automatically checks the corresponding price in other exchange's order books is provided the exchange only allows a match if a better price cannot be found elsewhere. In a preferred embodiment the order is automatically transferred to the exchange having the better price if this is the case, and the order is further processed at that exchange the method and device provides means so that investors will not have to worry about getting a better price elsewhere, when entering bids into an automated exchange.

12 Claims, 3 Drawing Sheets

METHOD AND APPARATUS FOR SETTING A PRICE FOR A SECURITY ON AN AUTOMATED EXCHANGE BASED ON A COMPARISON OF PRICES ON OTHER EXCHANGES

TECHNICAL FIELD

The present invention relates to a method and a device in an automated exchange, in particular to an automated exchange being connected to other exchanges.

BACKGROUND OF THE INVENTION AND STATE OF THE ART

In existing automated exchange systems for continuous trading (dealer market), a simple first in first served model in the matching is commonly used. Thus, if there is a selling price, which is matched by a buying price, the two orders are matched.

To increase liquidity there are Market Makers (quoters) who are required by the exchange to continuously enter two way quotes.

The basic idea is that Market makers must have a two way quote in the market all the time. The quotes (together with ordinary orders) create a best bid and offer that is sent out as the exchange official price. The best bid or offer is used by investors when deciding about buying or selling an instrument.

However, in today's exchanges it has become more and more common that the same financial instrument is trades at different exchanges at the same time. Furthermore, the price for the same financial instrument is not always the same at these different exchanges. However, investors are not interested in having to care about this. The investors want the best price available and demand that the exchange preferably should guarantee that it provides the best price if there is a deal. This has created a problem for investors, which have to chose the exchange at which the believe that they can obtain the best price at a particular moment.

SUMMARY

It is an object of the present invention to overcome the problem as outlined above and to provide an automated exchange having functionality which reduces or eliminates the risk for a person entering an order into an automated exchange to get a worse price than he could have gotten at another exchange.

This object is obtained by a method and a device which automatically checks the best bid/offer from other exchanges.

In a preferred embodiment the exchange only allows a match if a better price cannot be found elsewhere. Instead, the market maker (or primary market maker) of the exchange has entered a parameter to the exchange. The parameter indicates if the market maker is prepared to give a better price, and if so how much better. If the better price is better than or equal to the price offered at the other exchange, the deal is automatically closed at the price offered at the other exchange. If the price is still not equal to the price offered at the other exchange, the incoming order is placed in the order book, but no match takes place directly. Instead, a message is sent to the market maker. The market maker can then contact the other exchange and make a deal at their offered price and send a trade report with the customer order to the order book. If a deal is not made with the other exchange the other exchange will update their price to a worse price, and matching can now take place, since no other exchange offers a better price.

In another preferred embodiment, when the other exchange offering the better price is an automated exchange, the order is automatically transferred to the exchange having the better price if this is the case, and the order is processed further at that exchange, or the exchange automatically makes a deal with the other exchange and then in turn makes a deal with the customer.

By using such method and device investors will not have to worry about getting a better price elsewhere.

BRIEF DESCRIPTION OF THE DRAWINGS

The present invention will now be described by way of non-limiting examples and with reference to the accompanying drawings, in which.

DESCRIPTION OF PREFERRED EMBODIMENTS

Figure 1:
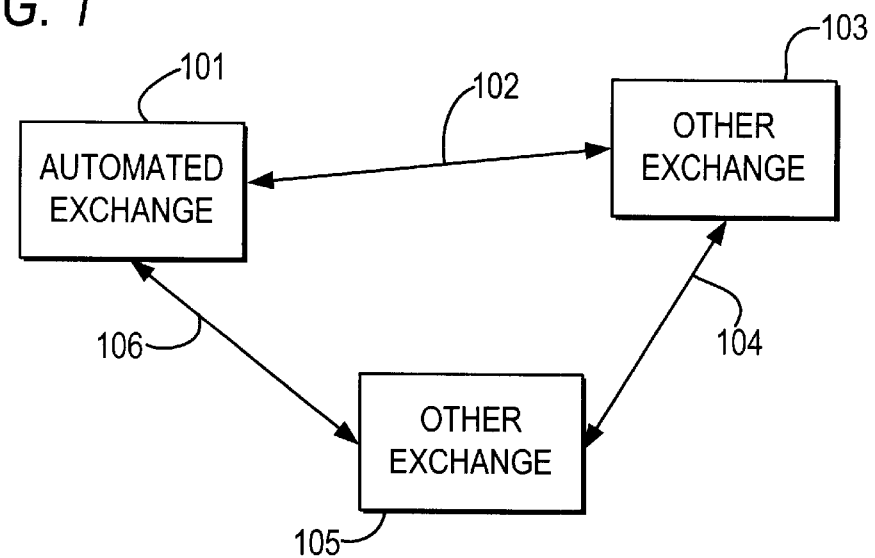
FIG. 1 is a general view of several interconnected exchanges.

In FIG. 1, a general view of several interconnected exchanges is shown. Thus, the exchanges 101, 103 and 105 are all interconnected by bi-directional communication paths. The communication paths 102, 104, and 106, interconnecting the different exchanges 101, 103 and 105, respectively can be wireless or wireline communication paths, which ever turns out to be the most suitable for the particular case. At least one of the exchanges 101 is an exchange according to the present invention.

Figure 2:
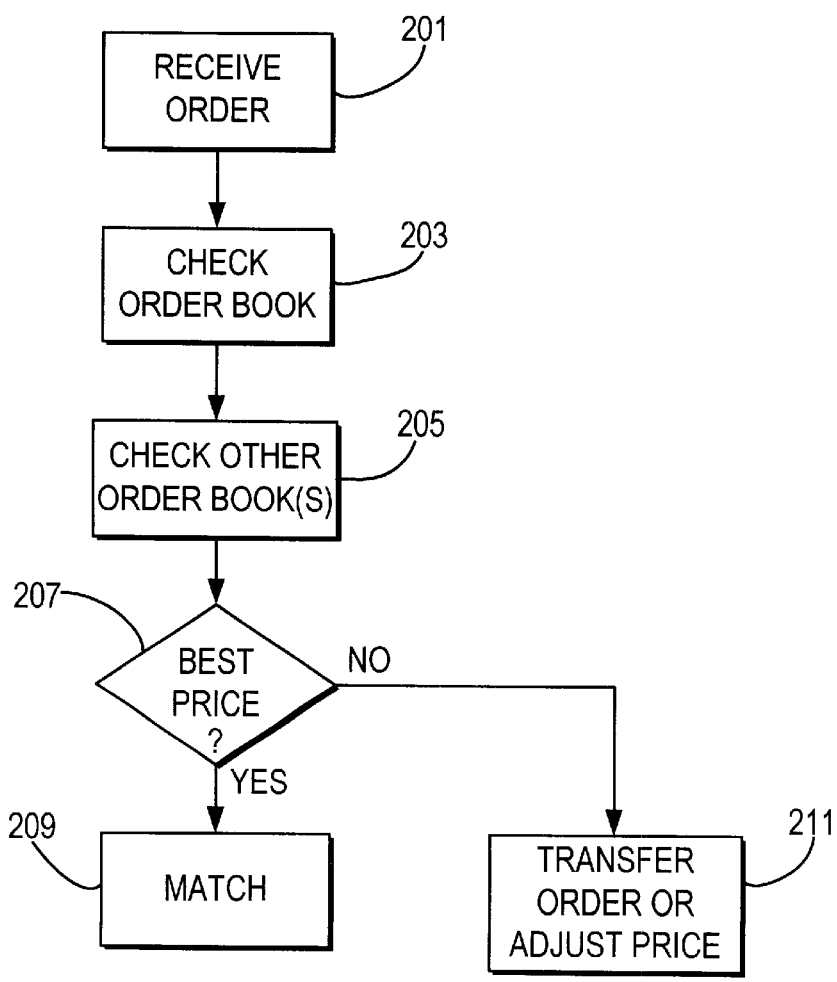
FIG. 2 is a flow chart illustrating the steps carried out in a procedure when matching orders in an automated exchange system.

In FIG. 2, a flow chart illustrating the steps carried out in a procedure when matching orders in the exchange system shown in FIG. 1 is shown. In the example below it is assumed that a buying order is received in the exchange 101, which is an automated exchange. The other exchanges can be open outcry exchanges or can be automated exchanges too.

Figure 3:
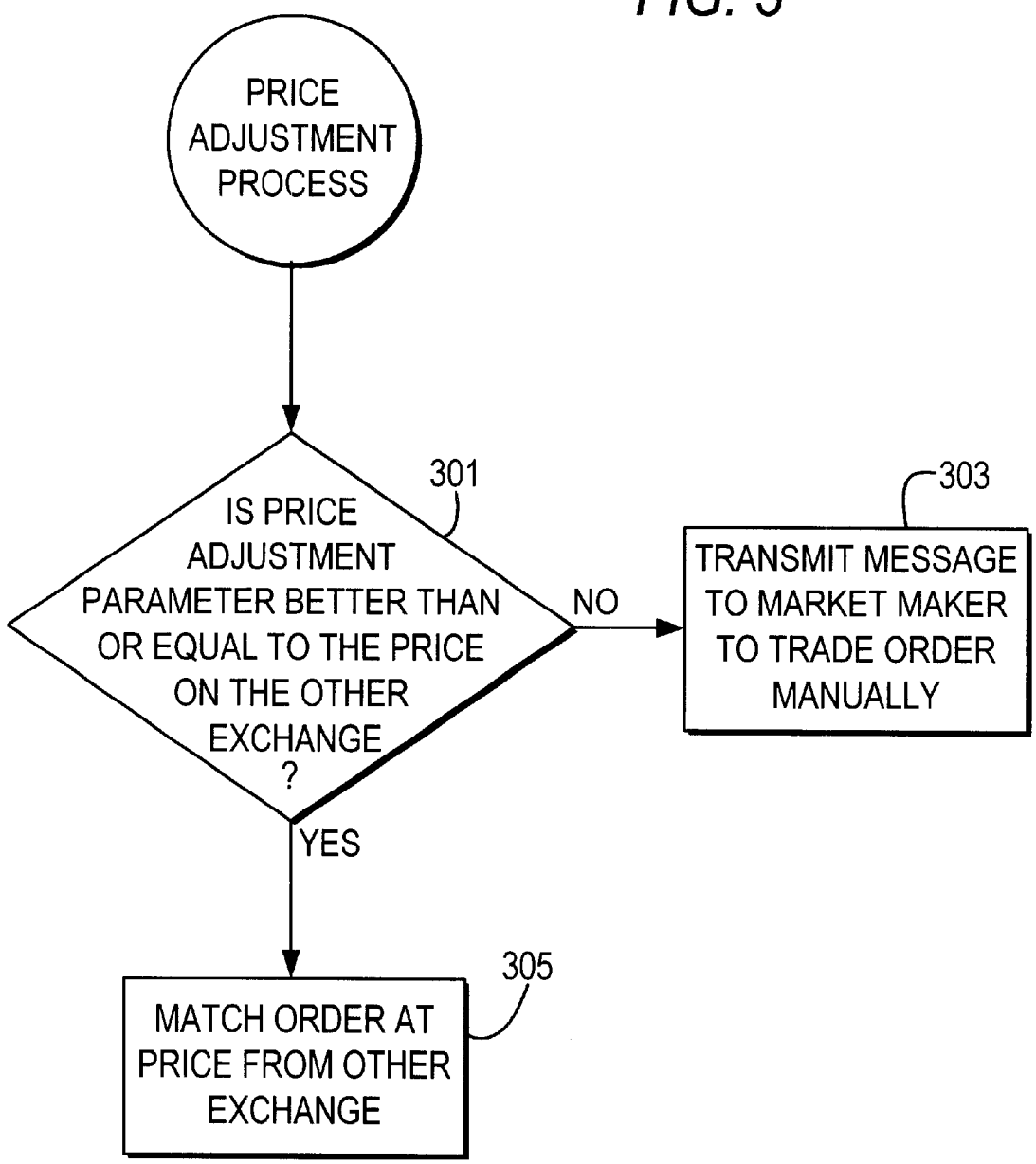
FIG. 3 is a flow chart illustrating the steps for adjusting a price according to an embodiment of the invention.

Thus, first in a step 201 the buying order is received. Next in a step 203 the best selling order in the order book is checked. Thereupon, the best selling orders in the other automated exchanges, i.e. the exchanges 103 and 105 in this example, is checked in a step 205. Then, in a step 207 the procedure determines where the best price can be obtained at the moment. Thus, if the best price can be obtained at the exchange 101 the procedure proceeds to a step 209 where matching takes place. Otherwise the procedure proceeds to a step 211, where the order is either transferred to another exchange or else the price for trading the order on the automated exchange 101 is adjusted. FIG. 3 shows a process for adjusting the price on the exchange 101, where the following steps are executed:

check if the market maker is prepared to adjust his price to the price offered by the other exchange in step 301. This is preferably carried out by checking a parameter which indicates how much the market maker is prepared to adjust his price. If the adjusted price is better or equal to the price offered by the other exchange in step 301, matching automatically takes place at the price offered by the other exchange in step 305. The parameter, which is set by the market maker, can also indicate the maximum volume which the market maker is prepared to trade at the adjusted price.

If the adjusted price is not equal to or better than the price offered by the other exchange in step 301 a message is transmitted to the market maker or to personnel at the exchange or the like in step 303.

The market maker receiving such a message can then contact the exchange offering the better price, close a deal at this price with the other exchange, and then close a deal with the customer who then will have received the best price. If a deal is not made with the other exchange, the other exchange will update their price to a worse price, and matching can now take place, since no other exchange offers a better price. The customer will thus have received the best price on the market in this case too.

In another preferred embodiment, when the other exchange offering the better price is an automated exchange in step 211 shown in FIG. 2, the order is automatically transferred to the exchange, i.e. the exchange 103 or 105 in this example, having the better price if this is the case, and the order is processed further at that exchange, or the exchange automatically makes a deal with the other exchange and then in turn makes a deal with the customer.

Furthermore, the customer may when entering his order to the automated exchange indicate that he wants the order to be traded at the automated exchange while ignoring prices at the other exchange. This can be beneficial if the customer is more interested in a quick deal than in the best price. Another example when this can be beneficial is when the customer wants trade a whole volume or nothing ("fill or kill").

Figure 4:
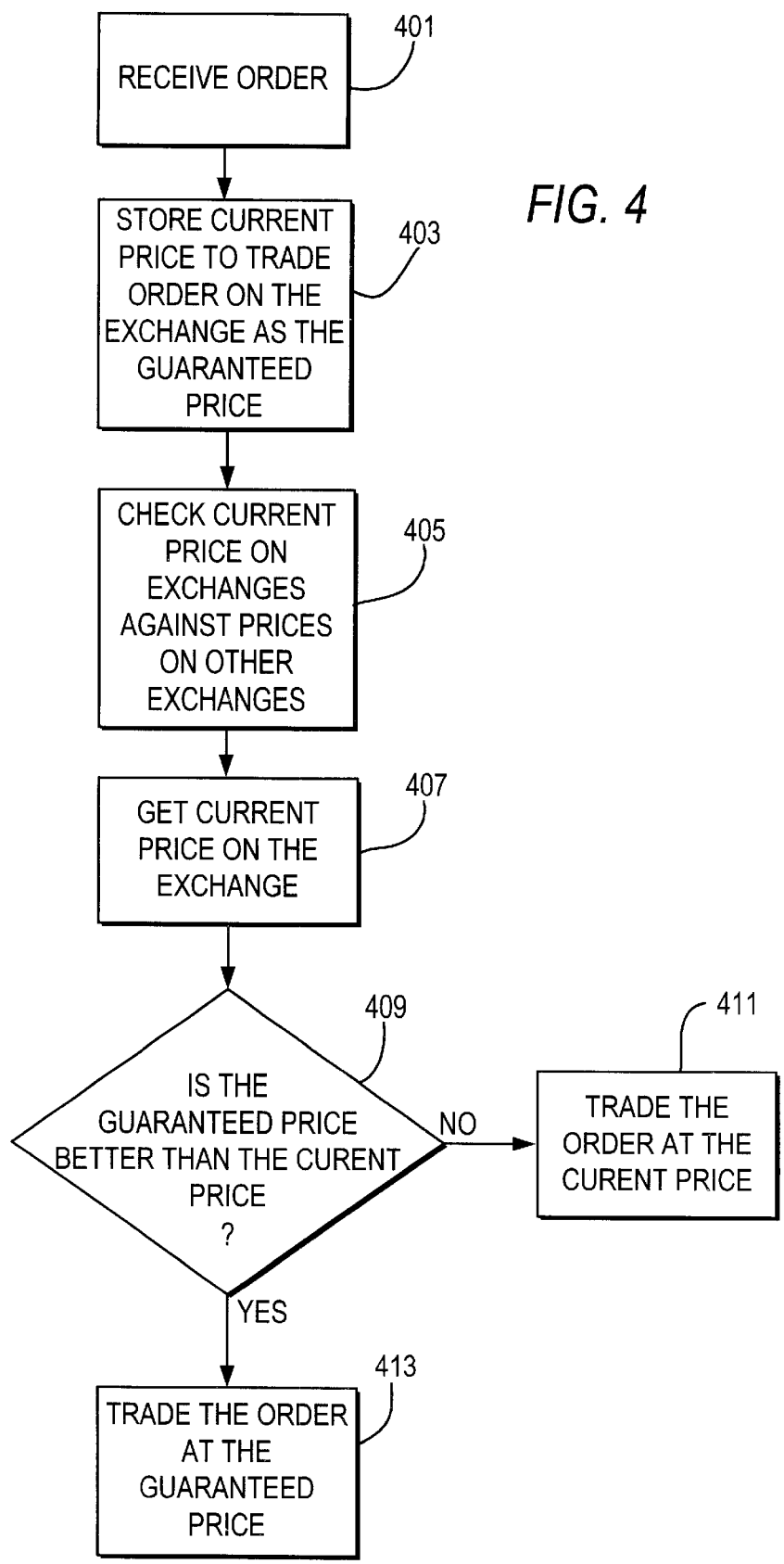
FIG. 4 is a flow chart illustrating the steps of matching an order according to a further embodiment of the invention.

In yet another preferred embodiment, illustrated in FIG. 4, the exchange guaranties that the customer gets the price offered by the exchange when the order is entered to the exchange at worst. This can be carried out in the following manner. First when the customer enters the order in step 401 the exchange checks its best price and at stores this price in a memory in step 403.

Thereupon, other events takes place before a match is done, e.g. the prices at other exchanges is checked in step 405 and the market maker possibly trades manually with another exchange. During this time there may be a change in the market resulting in that the price on the exchange in step 407 is worse than the price offered by the exchange when the costumer initially entered his order. Thus, before matching is performed, the guarantee price stored in the memory is checked in step 409 and if the guarantee price is better than the best price the customer gets the guarantee price in step 413.

In this manner the customer is always guaranteed to get the price offered by the exchange when he enters his order. The guaranteed price can be limited by the market maker or primary market maker to a certain maximum volume.

By using such method and device investors will not have to worry about getting a better price elsewhere.

What is claimed is:

1. A method in an automated exchange being connected to one or more remote exchanges, comprising the steps of:

receiving an adjusted price parameter by the automated exchange from a market maker, wherein the adjusted price parameter includes a price differential and an adjusted size;

receiving an order by the automated exchange;

establishing an automated exchange price;

checking prices for matching the order on the one or more remote exchanges;

determining which of the automated exchange price and the prices on the one or more remote exchanges is a best price for matching the received order;

determining that a difference between the automated exchange price and the best price equals the price differential;

determining that a size of the order is less than the adjusted size; and automatically offering the best price to trade the received order without adjusting the automated exchange price.

2. A method according to claim 1, further comprising:

determining that the size of the order is greater than the adjusted size;

issuing a message to the market maker; and receiving from the market maker a manually entered price.

3. A method in an automated exchange being connected to one or more remote exchanges, comprising the steps of:

receiving an order by the automated exchange;

storing a price offered by the automated exchange at a time the order is received;

checking prices for matching the order on the one or more remote exchanges;

establishing a next automated exchange price to match the order at a time after the order is received;

determining which of the next automated exchange price and the prices on the one or more remote exchanges is a best price for matching the order; and comparing the stored price with the best price and, if the stored price is better than the best price, automatically trading the received order at the stored price.

4. An automated exchange connected with one or more remote exchanges, the automated exchange comprising:

means for receiving an adjusted price parameter from a market maker, wherein the adjusted price parameter includes a price differential and an adjusted size;

means for receiving an order;

means for establishing an automated exchange price;

means for comparing the automated exchange price with prices for matching the received order on the one or more remote exchanges to determine a best price for matching the received order;

means for determining that a difference between the automated exchange price and the best price equals the price differential;

means for determining that a size of the order is less than the adjusted size; and means for automatically offering the best price to trade the received order without adjusting the automated exchange price.

5. An automated exchange according to claim 4, further comprising:

means for determining that the difference is greater than the price differential;

means for issuing a message to the market maker; and means for receiving from the market maker a manually entered price.

6. An automated exchange connected with one or more remote exchanges, the automated exchange comprising:

means for receiving an order;

means for storing a price offered by the automated exchange at a time the order is received;

means for establishing a next price for matching the order at a time after the order is received;

means for comparing the next price for matching the order with prices for matching the order on the one or more remote exchanges to determine a best price for matching the order;

means for comparing the stored price with the best price; and means for automatically offering the better of the stored price and the best price.

7. A method according to claim 1, comprising the further step of:

storing the automated exchange price at a time the order is received.

8. An automated exchange according to claim 4, further comprising means for storing the automated exchange price at a time the order is received.

9. A method according to claim 2, comprising the further step of:

storing the automated exchange price at a time the order is received.

10. An automated exchange according to claim 5, further comprising means for storing the automated exchange price at a time the order is received.

11. A method in an automated exchange being connected to one or more remote exchanges, comprising the steps of:

receiving an adjusted price parameter by the automated exchange from a market maker, wherein the adjusted price parameter includes a price differential and an adjusted size;

receiving an order by the automated exchange;

establishing a first automated exchange price;

storing the first automated exchange price at a time the order is received;

checking prices for matching the order on the one or more remote exchanges;

establishing a second automated exchange price at a time after the order is received;

comparing the second automated exchange price with the prices offered by the remote exchanges to determine a best price;

determining that a difference between the second automated exchange price and the best price equals the price differential;

determining that a size of the order is less than the adjusted size;

comparing the stored first automated exchange price with the best price; and if the stored first automated exchange price is better than the best price, automatically offering the stored first automated exchange price without adjusting the second automated exchange price.

12. An automated exchange connected with one or more remote exchanges, comprising:

means for receiving an adjusted price parameter by the automated exchange from a market maker, wherein the adjusted price parameter includes a price differential and an adjusted size;

means for receiving an order;

means for establishing a first automated exchange price;

means for storing the first automated exchange price at a time the order is received;

means for checking prices for matching the order on the one or more remote exchanges;

means for establishing a second automated exchange price at a time after the order is received;

means for comparing the second automated exchange price with the prices offered by the remote exchanges to determine a best price;

means for determining that a difference between the second automated exchange price and the best price equals the price differential;

means for determining that a size of the order is less than the adjusted size;

means for comparing the stored first automated exchange price with the best price; and if the stored first automated exchange price is better than the best price, means for automatically offering the stored first automated exchange price without adjusting the second automated exchange price.

* * * * *